Feb. 24, 1948.  B. D. GOLDBERG  2,436,566
SAFETY VENT FOR PRESSURE COOKERS
Filed July 28, 1944  2 Sheets-Sheet 1
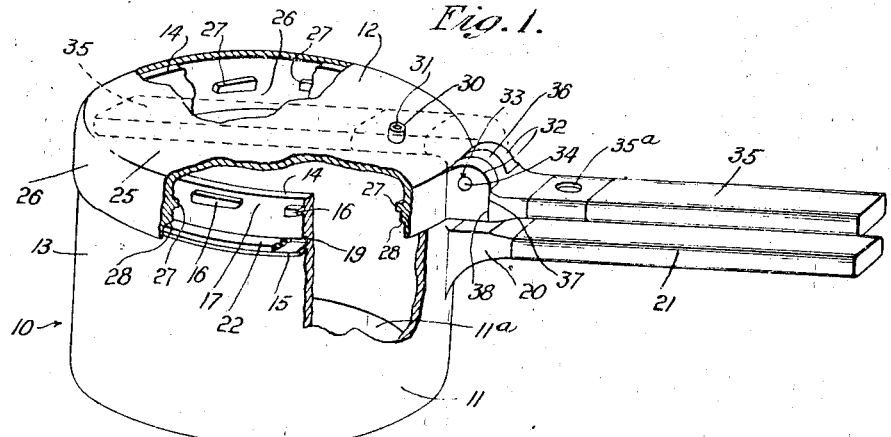

Feb. 24, 1948.　　　　B. D. GOLDBERG　　　　2,436,566
SAFETY VENT FOR PRESSURE COOKERS
Filed July 28, 1944　　　　2 Sheets-Sheet 2
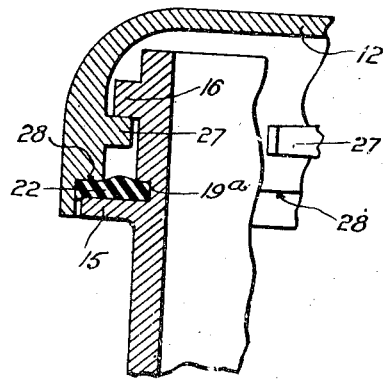
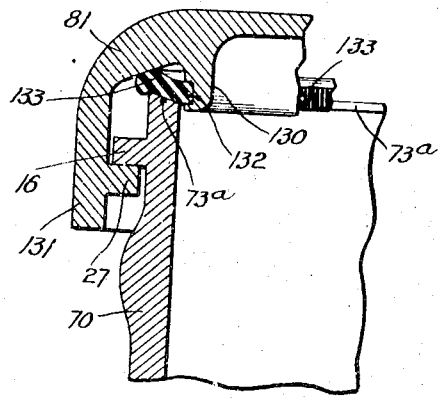
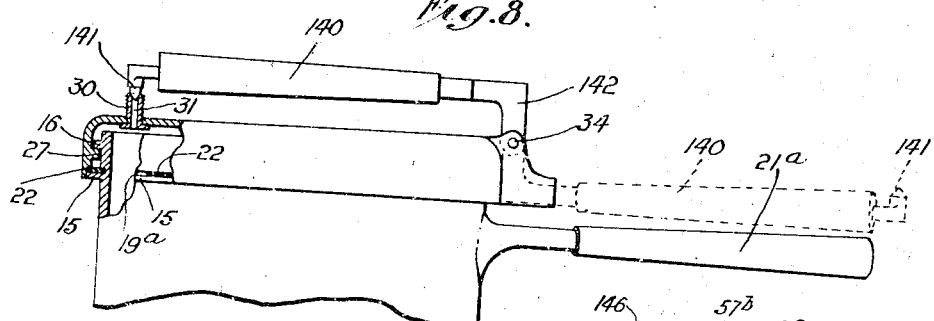
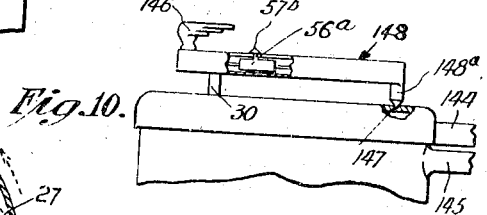
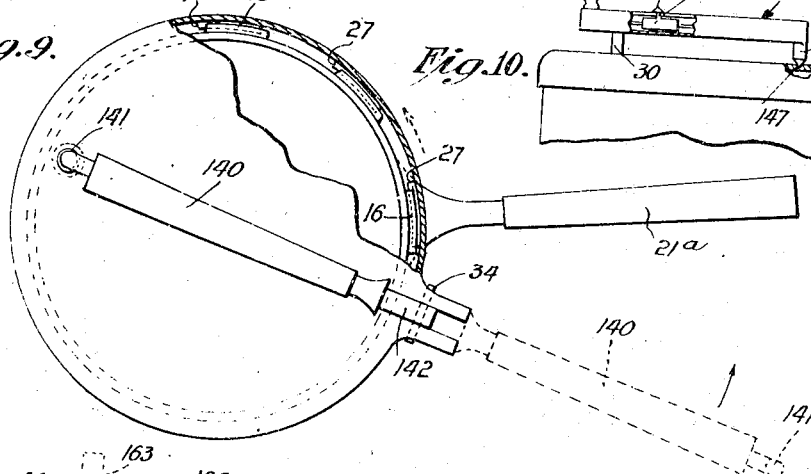
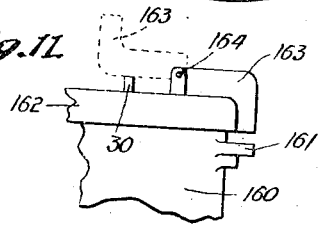
INVENTOR
Benjamin D. Goldberg
BY
Percy Freeman
ATTORNEY Patented Feb. 24, 1948

2,436,566

UNITED STATES PATENT OFFICE 2,436,566

SAFETY VENT FOR PRESSURE COOKERS

Benjamin D. Goldberg, Brooklyn, N. Y.

Application July 28, 1944, Serial No. 547,051

7 Claims. (Cl. 220—44)

This invention relates to pressure cookers.

An object of this invention is to provide a pressure cooker comprising a container having a handle, and a cover therefor likewise having a handle, and interlocking means on the cover and container so constructed that the cover may be secured to the container by rotating the cover relative to the container with the interlocking means invisible, the interlocking means being further so constructed in relation to the handles that the relative position of the handles serves to indicate whether the cover is locked to or unlocked from the container, that when the handles are above each other and in vertical registry the interlocking means will permit the cover to be fitted on the container in exact position preparatory to interlocking. Thus the positioning of the handles in registry serves to indicate that the cover is in such angular position relative to the container as to permit the cover to be fitted onto the container or taken off the container, whereas the positioning of the handles in diverging relative relations indicates to the user that the cover is locked.

Another object of this invention is to provide a pressure cooker of the character described comprising a container and a cover therefor, said container and cover having mutually interlocking lugs and a flexible seal interposed between the cover and container for effecting a tight seal, this seal being held in position by its inner circumferential edge slightly stretched and snugly fitted to the cooker, its outer open edge being away from the cooking chamber so that no particles can be deposited around its edge.

Another object of this invention is to provide a pressure cooker comprising a container and a cover therefor, with a radial handle on each, and a relief vent through the cover, one of the handles being swingable to a position over the vent to rest thereon and cover the same, thereby maintaining pressure within the cooker equivalent to that of the weight of the handle resting on the vent.

Another object of this invention is to provide, in a pressure cooker of the character described, means on the handle to adjust the weight imposed on the vent by the handle, thereby to regulate various degrees of pressure at which the vent will open.

Another object of this invention is to provide a pressure cooker of the character described comprising a container and a cover thereon, a vent on the cover, and handles on the container and cover respectively, one of said handles being swingable to overly the vent, the construction being such that the handle must be swung off the vent to release the pressure within the cooker and permit the escape of steam, to avoid the possibility of injury to the user, before the handle assumes an extended position to facilitate rotation of the cover to release it from the container.

Yet another object of this invention is to provide a pressure cooker of the character described comprising a container member and a cover member, and a handle on one of said members serving either to close a vent in the cover for preventing internal pressure within the container from escaping through the vent until it has reached a given degree of pressure or serving for the purpose of aiding in rotating the member to which it is connected, relative to the other member, said handle being operative for only one of said purposes at a time.

A further object of this invention is to provide a pressure cooker of the character described comprising a container and a cover therefor, a radial handle on the container and a radial handle on the cover, and a vent on the cover, the construction being such that no pressure can be built up within the cooker while the handles are in a radially extending position.

Yet a further object of this invention is to provide a pressure cooker of the character described comprising a container and a cover therefor, and a seal plate centrally attached to the underside of the cover and having means to engage the rim edge of the container, and a vent passing through the center of the cover and the seal plate and serving as a pivot for rotatably attaching the seal plate to the cover, whereby to permit relative rotation between the seal plate and the cover so that when the seal plate engages the sealing gasket on the container it will not rotate while the cover is being rotated to interlock with the container.

Still another object of this invention is to provide a pressure cooker having a cover formed with a vent and means for covering said vent, said means, though attached to the cover, being movable to a position to uncover the vent and in such position to serve as a handle for the cover. The means covering the vent may also become a handle for the container if attached to the container.

Yet another object of this invention is to provide a strong and durable pressure cooker of the character described which shall be relatively inexpensive to manufacture, easy to manipulate, safe to operate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention:

Fig. 1 is a perspective view of a pressure cooker embodying the invention, with parts broken away and in cross-section.

Fig. 2 is an elevational, cross-sectional view of a pressure cooker embodying the invention and illustrating a modified form thereof.

Fig. 3 is a perspective view of a modified form of handle for the cover, adjustable to vary the pressure at which the vent is relieved.

Fig. 4 is an elevational, cross-sectional view of a handle embodying the invention and illustrating a modified form thereof and shown on the cover to close a vent.

Fig. 5 is a fragmentary view partly in section and similar to Fig. 2, and illustrating a modification.

Fig. 6 is a fragmentary cross-sectional view of the device shown in Fig. 1 and drawn to an enlarged scale to illustrate the seal for the cooker.

Fig. 7 is a view similar to Fig. 6 and illustrating another form of the seal.

Fig. 8 is a fragmentary elevational view partly in cross-section and showing a still further modification.

Fig. 9 is a plan view of the modification shown in Fig. 8, with parts broken away and illustrating the interlocked position of cover and container.

Fig. 10 is a fragmentary elevation (partly in section) of a further modification.

Fig. 11 is a fragmentary elevation of still a further modification of the invention.

Referring now in detail to the drawing, and particularly to Fig. 1, 10 designates a pressure cooker embodying the invention and comprising a container 11 and a cover 12. The container 11 has a bottom wall 11a and a cylindrical wall 13. On said cylindrical wall 13 is a horizontal radial projection 20 to which there is fixed, in any suitable manner, a handle 21. Cylindrical wall 13 has an annular upper rim edge 14. Said cylindrical wall 13 is furthermore formed on the outer side thereof, below the rim 14 thereof, with an outwardly extending annular flange 15 parallel to the rim 14. Said cylindrical wall 13 is furthermore formed on the outer surface thereof and between rim 14 and flange 15 with a plurality of similar, spaced, inclined or part-helical locking ribs or lugs 16 having spaces 17 therebetween. Said cylindrical wall 13 is also formed on the outer surface thereof between the lugs or ribs 16 and flange 15 with an annular groove 19 above flange 15 and parallel thereto.

Fitted within the circumferential groove 19 and extending outwardly therefrom is a horizontal sealing ring or gasket 22 overlying the annular flange 15.

The cover 12 has a top wall 25 and is formed with an integral downwardly extending cylindrical wall 26 adapted to receive the upper end of the container. Wall 26 is formed on the inner surface thereof with a plurality of inwardly extending similar, spaced ribs or lugs 27 adapted to pass through the spaces 17 and then engage beneath the lugs 16 as the cover is rotated relative to the container, for interlocking the cover to the container. The cover is formed on the inner surface thereof with an internal shoulder 28 adapted to press the ring or gasket 22 down against flange 15 when the cover is interlocked with the container to form a seal. Fixed to the cover and extending through a hole in the cover is an upwardly extending tubular projection 30 formed with a through opening 31. The opening 31 is a vent for the relief of pressure from the container.

Formed with wall 26 of the cover are spaced parallel, vertical ears 32 formed with aligned openings 33 supporting a transverse horizontal pivot pin 34. Pivoted to the pin 34 is a handle 35 for the cover. The handle 35 may be formed with a central apertured ear 36 disposed between ears 32 and formed with an opening through which the pivot pin 34 passes.

On the handle are vertical shoulders 37 to contact a surface 38 on the ears 32 to retain the handle in horizontal position when the handle is swung outwardly to the extended position shown in Fig. 1. Handle 35 is formed with a recess 35a adapted to receive a gasket for contacting the upper edge of the tubular projection 30, when the handle is swung to the dotted line position shown in Fig. 1, overlying the cover.

The handles on the cover and container are so located relative to the lugs 27 and 16 that when the handles 35 and 21 are in registry, that is one above the other as shown in Fig. 1, the lugs 27 of the cover are aligned with and will pass through the spaces 17. Thus, vertical alignment of the handles serves as a guide to indicate the relative position of the locking lugs, and in such position the pressure cooker is unlocked.

Rotation of the cover relative to the container 11 will lock the cover to the container. To cause rotation of the cover relative to the container, the handles 35 and 21 are pulled horizontally in opposite directions, thus moving the handles out of registry to a position where the handles will diverge or be separated, one relative to the other, and in such position the cover will be locked to the container.

Thus, the user desiring to place the cover on the container will place the cover in a position where the handle 35 is directly over handle 21, and in such position the lugs 27 will pass through the spaces 17 thereby facilitating manipulation of the cooker. If it is desired to unlock the cover, the user merely moves the handles 35, 21 from unaligned position to aligned or registering position, and then he will know that the cover is in such position that it can be lifted off the container. It will thus be seen that no searching or feeling is required to locate the lugs relative to each other.

It will be noted, furthermore, that handle 35 has more than one use. It serves as a handle for supporting and for rotating the cover; as a pressure regulator when it covers the vent opening to prevent escape of internal pressure within the container until the pressure reaches a predetermined value; and since it must be lifted off the vent in order to open the cooker, it further serves to permit the discharge of the accumulated pressure before removing the cover from the container so as to avoid the possibility of injury to the user.

It will be noted, furthermore, that the handle can have only one of such uses at a time. Thus if the handle is swung over the top of the cover it serves to control the vent closure during the cooking operation. The user must swing the handle back to the extended full line position of Fig. 1 to relieve pressure before the cover is unlocked.

In Fig. 2 there is shown a pressure cooker 10a embodying the invention and illustrating another form thereof. The cooker 10a comprises container 70 having a bottom wall 71 and a cylindrical wall 72 formed with an upper rim edge 73. Extending from cylindrical wall 72 is an extension 74 to which is screwed a radial rod 75. On rod 75 is a handle 76 formed with a through opening through which the rod 75 passes. Cylindrical wall 72 is formed on the outer surface thereof with a set of spaced lugs 16 similar to those shown in Fig. 1 of the drawing. Below the lugs 16, wall 72 is formed on the outer surface thereof with an outwardly extending bulge or enlargement 78. On the container 70 is a cover 80 which is formed with a top wall 81 and with a downwardly extending cylindrical wall 82 provided on the inner surface thereof with spaced ribs or lugs 27 similar to the lugs 27 shown in Fig. 1 for engagement with the lugs 16. The lugs 27 pass through the spaces between the lugs 16, and rotation of the cover then interlocks the same to the container. On cylindrical wall 82 of cover 80 are spaced, apertured ears 85 carrying a transverse pin 86. Pivoted to pin 86 is a cover handle 87 which comprises an apertured ear 87a received between the ears 85 and formed with an opening through which passes the pivot pin 86. The handle 87, furthermore, comprises a rod 88 screwed to the ear 87a, and received on the rod is a handle member 89. Handle member 89 is formed with a recess 90 receiving a gasket or washer 91 for the purpose hereinafter appearing.

Cover 80 is formed with a central opening 93, through which extends a tubular member 94 formed at its lower end with an outwardly extending flange 95. Screwed to the upper end of tube 94 is a nut 96. Attached to the underside of cover 80 is a seal plate 100 preferably made of resilient material such as sheet steel. Plate 100 is formed with a central opening 101 through which passes the shank of tube 94. Flange 95 contacts the underside of plate 100. Tube 94 may be fixed to the plate 100, if desired. Interposed between nut 96 and the top of cover 80 is a washer or gasket 102. Plate 100 has a generally concave portion 105 and a peripheral annular beaded portion terminating in a flange 106 forming on its underside an annular shoulder 107. Seated on the shoulder 107 is a ring gasket 108 contacting the upper rim 73 of container 70. When the cover is locked to the container, the rim of plate 100 will exert downward pressure against the rim to seal the container. The vent forms a central pivot between seal plate 100 and cover 81. Obviously, in this modification, the seal plate 100 will be pressed downwardly and will not rotate on its gasket to cause wear while the cover 80 rotates to lock the container.

In Fig. 3 there is shown a handle 39 so constructed as to allow for adjustment of the relief pressure for the cooker. The handle 39 comprises an apertured ear 40 from which there extends a flat shank 41. Extending from the shank 41 is an elongated tongue 42 which may be marked with a scale 43. Slidably mounted on tongue 42 is a flat sleeve 44 formed with a longitudinal slot 45 to receive the tongue. The cross-section of sleeve 44 is substantially the same as shank portion 41. Attached to the inner end of sleeve 44 is a leaf spring 46 adapted to contact the top of tongue 42 so as to feel the scale grooves 43. Upon sliding the sleeve 44 outwardly on tongue 42, the weight upon the vent tube is increased, thereby increasing the relief pressure. Thus the desired relief pressure may be easily adjusted.

It will be noted that the tube 30 in Fig. 1 is offset from the center of the cover toward the handle hinge pin 34. The advantage of this construction is that a greater pressure can be imposed on the vent.

In Fig. 4 there is shown a handle 35b illustrating another modified form of handle with adjustable weight. Handle 35b is formed with an apertured ear 50 for receiving the pivot pin 34 on the cover 12. Screwed to the ear 50 is a rod 51 formed with a loop 52 at its outer end. On rod 51 is a fixed handle portion 53 formed with a longitudinal chamber 54 and with a longitudinal slot 54a at the top wall of the chamber. Rod 51 passes through said chamber. Slidably mounted on rod 51 and disposed within chamber 54 is a weight 56 provided with an upwardly extending marker 57 projecting through slot 54a. On the underside of handle portion 55 is formed a recess 60 in which is placed a disk 57a adapted to contact the upper edge of tube 30 on the cover 12. Shifting of the weight 56 adjusts the pressure at which the vent will open.

In Fig. 5 there is shown a pressure cooker 10b comprising a container 110 and a cover 111 adapted to be interlocked thereon in the same manner as cover 80 of Fig. 2, and likewise provided with a sealing plate 100 to engage the upper rim edge of the container. The cover 111 is, in this case, provided with a fixed handle 112 while container 110 has a handle 113 pivoted to a boss 114 of the container. When the handle 113 is extended to the full line position shown in Fig. 5 and alongside of handle 112, the cover plate 111 is in such angular position relative to the container that the former may be fitted over the latter. Then upon horizontally separating the handles 112 and 113, the interlocking lugs on the cover and container interlock. In this form the handle 113 may be swung to the dotted line position shown in Fig. 5 to cover the vent opening 115.

In Fig. 6 there is shown a fragmentary section of pressure cooker similar to pressure cooker 10, drawn to an enlarged scale, and showing the groove 19a just above the flange 15 so that the gasket or ring 22 rests on the flange and is engaged by the shoulder 28 of the cover 12 when the cover is interlocked. It will be noted that the sealing ring or gasket 22 is gripped or held at its inner circumference and has greater holding or gripping power on its support. Also note that the seal is projected away from the interior of the container to avoid contact with food within the container. No free edge of the sealing ring extends into the container space.

In Fig. 7 there is shown a modified form of pressure cooker somewhat similar to pressure cooker 10a, with the sealing plate 100 omitted. Instead, the cover 81 is provided with an annular downwardly extending rim or lip 130 concentric with the outer skirt or wall 131, and formed with an annular external groove 132 to receive the inner edge of an annular ring or gasket 133, so that the free edge of the gasket extends towards the outer wall 131. When the cover is interlocked to the container by means of interlocking lugs 16 and 27 the gasket 133 contacts the upper rim edge 73a of the container 70 to seal the cover 81 to the container.

In Figs. 8 and 9 there is shown a further modified form in which the handle 140 is hinged as at 34 to the cover which is provided with a tubular nipple 30 having the vent opening 31, but in this case the vent is located diametrically opposite the pivot 34 of the handle. The free end of the handle is provided with a tapered projection 141 arranged to extend into the top of the vent tube much like a valve plug. If it be desired to regulate the pressure in the cooker, the handle 140 may be provided with adjustable sliding weight means as illustrated in Fig. 4. The pivoted end of the handle may be provided with the right angled extension 142, the lower end of which may be engaged by the hinge pin 34. The container may have fixed handle 21a and be provided with flange 15 upon which rests sealing gasket 22. The container may also have lugs 16 for interlocking association with lugs 27 on the cover.

It may be desired to have both the cover handle and the container rigid and still obtain advantages of the invention. To this end there is shown in Fig. 10 a modification in which the handles 144 and 145 are rigidly affixed to their respective parts. The cover is provided with a vent tube 30 and with an indentation or notch 147. An elongated tubular bar 148 may be used to have one end rest upon the vent tube 30 and a right-angled extension 148a having its tapered end adapted to nest in the depression or notch 147. The tubular or chambered bar 148 may be provided with a weight 56a slidably adjustable longitudinally of the bar by means of the button 57b extending above the surface of the bar. For convenience in lifting and replacing the bar 148, it may be provided with a handle 146.

In Fig. 11 there is shown a further modification wherein the extending handles may be omitted. In this form, by way of example, there is shown container 160 provided with a short handle or grip 161. The cover 162 may be provided with a grip member 163 pivoted at 164 to rest on the edge of the cover as shown in full lines, so that the grips 161 and 163 may be grasped by the hands of the user in order to manipulate the cover relative to the container. When the container and cover are interlocked, the cover grip 163 may be swung over into the dotted line position in Fig. 11, to rest upon the vent 30 as previously explained.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, what I claim as new and desire to secure by Letters Patent is:

1. In a pressure cooker of the type wherein a cover and pot are interlockingly engaged and sealed by relative rotation between them about a common axis; a radially extending handle on the pot, a radially extending handle on the cover, a vent through said cover, the cover handle being pivoted horizontally to the cover and swingable in a vertical arc selectively to either of two positions, first to a position overlying and closing the vent, and second to a position radially extending beyond the periphery of the cover to serve as a lever arm for cooperation with the pot handle to facilitate rotating the cover relative to the pot and whereby said pivoted handle is inoperative as a vent closure.

2. In a pressure cooker of the type wherein the container and cover have spaced interlocking lugs engageable upon rotating the cover relative to the container, a sealing gasket between the cover and the container, a vent through said cover, a radially extending handle on the container and a handle pivoted to the cover about a horizontal pivot and positionable radially outwardly of the cover to serve as a lever arm for cooperation with the container handle to facilitate rotating the cover relative to the container to lock and unlock the same, said cover handle being swingable to a position overlying and resting upon and closing the vent.

3. In a pressure cooker of the type wherein a cover and pot are interlockingly engaged and sealed by relative rotation between them about a common axis; a radially extending handle on the pot, a radially extending handle on the cover, a vent through said cover, the cover handle being pivoted horizontally to the cover and swingable in a vertical arc selectively to either of two positions, first to a position overlying and closing the vent, and second to a position radially extending beyond the periphery of the cover to serve as a lever arm for cooperation with the pot handle to facilitate rotating the cover relative to the pot and whereby said pivoted handle is inoperative as a vent closure, and means on said pivoted handle to vary the weight overlying the vent.

4. In a pressure cooker of the type wherein a cover and pot have mutually interlocking lugs which are interlockingly engaged and sealed by relative rotation between the cover and pot about a common axis; a radially extending handle on the pot, a radially extending handle on the cover, a vent through said cover, the cover handle being pivoted horizontally to the cover and swingable in a vertical arc selectively to either of two positions, first to a position overlying and closing the vent, and second to a position radially extending beyond the periphery of the cover to serve as a lever arm for cooperation with the pot handle to facilitate rotating the cover relative to the pot and whereby said pivoted handle is inoperative as a vent closure, said handles being so disposed with relation to the interlocking lugs that the handles are in substantially vertical alignment when the members are unlocked, and in divergent relative relation when the members are interlocked.

5. In a pressure cooker of the type wherein the container member and cover member have spaced interlocking lugs engageable upon rotating one member relative to the other, a vent through one of the members, an arm on each of said members radially extending beyond the periphery of said members, one of said arms being pivoted to its respective member about a horizontal pivot and selectively positionable either radially outwardly of its member or inwardly to a position overlying and resting upon and closing said vent.

6. In a pressure cooker of the type wherein the container member and cover member have spaced interlocking lugs engageable upon rotating one member relative to the other, a vent through one of the members, an arm on each of said members radially extending beyond the periphery of said members, one of said arms being pivoted to its respective member about a horizontal pivot and selectively positionable either radially outwardly of its member or inwardly to a position overlying and resting upon and closing said vent, and means on said pivoted arm to vary the weight overlying the vent.

7. In a pressure cooker of the type wherein the container member and cover member have spaced interlocking lugs engageable upon rotating one member relative to the other, a seal plate between the cover and container members, a vent through the seal plate and the cover member, an arm on each of said members radially extending beyond the periphery of said members, one of said arms being pivoted to its respective member about a horizontal pivot and selectively positionable either radially outwardly of its member or inwardly to a position overlying and resting upon and closing said vent.

BENJAMIN D. GOLDBERG.

REFERENCES CITED

The following references are of record in the file of this patent:

UNITED STATES PATENTS

| Number | Name | Date |
|---|---|---|
| 77,778 | Spencer | May 12, 1868 |
| 347,645 | Schaefer | Aug. 17, 1886 |
| 461,120 | McKinley | Oct. 13, 1891 |
| 932,171 | Pinson | Aug. 24, 1909 |
| 1,204,055 | Nash | Nov. 7, 1916 |
| 2,102,962 | Ludington | Dec. 21, 1937 |
| 2,103,935 | Cossais | Dec. 28, 1937 |
| 2,139,395 | Walker | Dec. 6, 1938 |
| 2,198,125 | Nelson | Apr. 23, 1940 |
| 2,218,188 | Wittenberg | Oct. 15, 1940 |
| 2,226,593 | Stroupe et al. | Dec. 31, 1940 |
| 2,254,570 | Hailey | Sept. 2, 1941 |
| 2,334,448 | Sheridan | Nov. 16, 1943 |

FOREIGN PATENTS

| Number | Country | Date |
|---|---|---|
| 28,574 | Germany | Sept. 11, 1884 |
| 624,155 | France | Mar. 29, 1927 |